United States Patent Office 3,676,004
Patented July 11, 1972

3,676,004
DEVICE FOR THE SPECTROCHEMICAL DETERMINATION OF THE CONCENTRATION OF AN ELEMENT IN A SAMPLE
Hans Prugger and Reimund Torge, Heidenheim, Germany, assignors to Carl Zeiss-Stiftung, doing business as Carl Zeiss, Heidenheim, Germany
Filed Dec. 17, 1970, Ser. No. 99,075
Claims priority, application Germany, Dec. 23, 1969, P 19 64 469.0
Int. Cl. G01j *3/30, 3/42*
U.S. Cl. 356—87                                        13 Claims

ABSTRACT OF THE DISCLOSURE

The invention represents an improvement in devices for the spectrochemical determination of the concentration of a particular element in a sample. A single radiation source is caused, by a frequency-shifting technique, to emit a time-alternating succession of two radiations, one of which is at a specific frequency that is characteristic of the particular element, and the other of which represents a slight spectral shift from the first radiation. The radiations are passed through the sample in time-alternation, and a synchronously commutated detector differentially evaluates the relation between two transmissions, attributable to the respective radiations. When the amplifier characteristic is logarithmic, the differential evaluation provides the quotient of the two detected transmissions.

In the spectrochemical analysis of samples, the chemist relies on atomic-absorption analysis as an essential technique. In such analysis, light radiation of a particular spectral-absorption line, characteristic of the desired element, is generally produced by a hollow cathode lamp and is then passed through the sample under investigation and onto a detector; the detector output enables measurement of the absorption. The measured values are proportional to the desired-element concentration as long as the measurement is free of unspecific background, e.g., "blank-value" interferences. "Blank-value" interference represents a degrading influence on the analysis, when the sample includes one or more elements other than the desired element and when such other elements have spectral-line characteristics at or substantially at the spectral line of particular interest.

When using a flame to excite the sample substance, the same is practically free of absorptions in the visible spectral range, regardless of the substance containing the element under investigation. However, in the ultraviolet spectral range, the various kinds of chemical gas flames provide unspecific absorptions, changing the background and with it the "blank value" of the analysis. On these absorptions (due to the flame) are superposed additional absorptions originating from the sample containing the element under investigation; the additional absorptions due to the other component elements of the sample extend over a wide spectral range in the manner of a band which is similar to the natural absorption of the flame. Thus, by way of example, in the trace analysis of urine on gold, an additional deflection is obtained which does not stem from the gold, but from the sodium content of the urine.

It is known that these degrading effects may be wholly or substantially eliminated by performing the atomic-absorption analysis by means of two radiations of different frequencies. One radiation consists of a specific frequency characteristic of the desired element and is accordingly absorbed by the sample. The other radiation consists either of a relatively narrow frequency band which also includes the characteristic frequency, or of another frequency which is not characteristic of the desired element. This second radiation is therefore substantially absorbed by the interfering background of the flame. In this circumstance, the quotient of the two absorption signals is almost independent of unspecific absorptions.

A prior apparatus for carrying out the atomic absorption analysis by means of two radiations comprises two different light sources; one of these is usually a line emitter emitting the resonance line intended to be absorbed, and the second is an emitter which substantially responds to the unspecific absorption of the flame and of the matter containing the element under investigation. Light from these two light sources is alternatingly passed through the sample, and a quotient indication is formed from the signal components sensed by the detector.

The prior device is expensive and not readily usable for all elements and types of samples, as a second light source must always be provided to emit light having a specific pre-established relation to the light produced by the first light source.

It is an object of this invention to provide a device which, while being of simple construction ensures a quantitative elimination of the unspecific background absorption and is applicable to any element without further measures.

Briefly, the invention contemplates using a single radiation source in a device for the spectrochemical determination of the concentration of an element in a sample; and means are provided for shifting the radiated frequency; as between a specific frequency characteristic of the element and a frequency deviating from the first one. These two radiations are passed in time-alternation through the sample onto a detector, and a relation is established electrically between the signals so obtained. The novel device is characterized in that the single radiation source emits a resonant frequency which is intermittently shifted to produce the second frequency.

Thus, the novel device operates with a single radiation source the frequency of which is a specific absorption characteristic of the desired element. The frequency shift need only be of such an extent that there will be no more specific absorption of the sample, so that the shifted frequency substantially responds to the unspecific absorption of the flame and of the other elemental constituents of the sample containing the element under investigation. When operating in the optical spectral range, the spectroscopic light source produces the desired specific resonance line, and to avoid the specific absorption of the sample, a shift of this line by about 0.1 A. is sufficient in most cases.

When the radiation source is a spectroscopic light source, then in a first mode of operation, for frequency-shifting modulation of the light, a magnetic field is established at the light source, with lines of magnetic flux extending parallel to the direction of observation of light emerging from the light source; magnetic-field strength at the location of the light source is caused to vary periodically, between zero and a maximum value. Thus, the linear Zeeman-effect in the longitudinal magnetic field is used to modulate (frequency-shift) the resonance line of the source. When the magnetic field at the light source reaches its maximum value, then instead of the first single resonance line, two lines of frequencies respectively greater and less than the resonance line occur in the spectral response of the radiation; these two frequencies account for the "splitting" pattern of the so-called normal Zeeman-effect, and the resonance line itself disappears. When the magnetic field returns to zero, only the unshifted resonance line characterizes the spectral response of the radiation. It follows that radiated light which reaches the detector has been influenced by the specific absorption in the sample, in time-alternation with the unspecific absorption in the sample. When forming or observing the quotient or the difference of these two signal components, the effects of unspecific absorption are eliminated, and only the specific signal remains.

In a second mode of operation of the invention, the light source is subjected to a magnetic field for which the lines of flux extend transversely to the direction of observation of the light emerging from the light source. However, when observing spectral lines showing the splitting pattern of the normal Zeeman-effect (in the presence of a magnetic field), the unshifted resonance line appears, in addition to the two lines shifted in the "splitting" Zeeman-effect action. In the presence of the magnetic field, the two shifted lines are polarized normal to the direction of the magnetic field, while the unshifted resonance line is polarized parallel to the direction of the magnetic field.

In this example of the Zeeman-effect in a transverse-oriented magnetic field, the successive separation of the resonance line and of the two shifted lines is obtained by steady or D-C (i.e., not pulsed) magnetic application of the field and by placing (between the light source and the detector) two successively effective polarizing filters having orthogonally related transmission orientations and suitably synchronized with the detector-amplifier.

The desired shifting or separation of spectral lines may also be obtained by selecting a transverse magnetic field, the field strength of which at the location of the light source varies periodically between zero and a maximum value, and by arranging a polarizing filter of fixed direction of transmission between the light source and the detector. This particular embodiment of the invention is particularly advantageous in the case of resonance lines with more complex splitting, in which (for observation transverse to the direction of the lines of magnetic flux) several lines occur which are polarized parallel to the direction of the magnetic field. It is possible also in this case, by modulation of the magnetic field, to maintain the unshifted resonance line.

It is of particular advantage to use an electrodeless high-frequency discharge as the spectroscopic light source. Such discharge lamps can be designed sufficiently compact that the required high magnetic-field strength is attainable, without entailing great bulk in the overall apparatus. Electrodeless discharge lamps are excited by a high-frequency field applied from the outside; the plasma they produce is not affected by the presence of a surrounding magnetic field.

In some cases, it may also be advantageous to use a hollow cathode lamp of specific construction as the spectroscopic light source. In such case, provision must be made to assure that the discharge is not unfavorably affected by the surrounding magnetic field.

The indicated frequency-shifted radiation may also be produced when the radiation source is a quantum-electronic source, such as a dye laser, in which case the laser frequency is effectively modulated (shifted) by interposing a Fabry-Perot filter between elements of the laser system and by periodically changing the inclination of the filter with respect to the laser axis. A dye laser produces a relatively wide resonance line, and it is therefore possible by means of the Fabry-Perot filter to separate two different closely adjacent sharp lines.

The invention will now be described in greater detail with reference to the FIGS. 1 to 6 of the accompanying drawings, in which.

Figure 1:
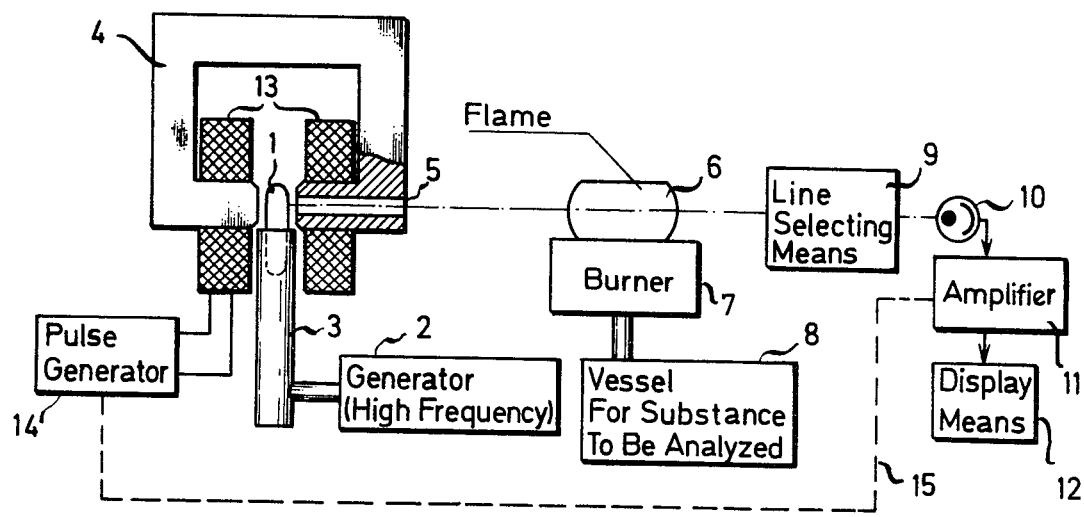
FIG. 1 is a simplified diagram schematically illustrating an embodiment of the invention which uses the linear Zeeman-effect in the longitudinal magnetic field.

In FIG. 1, reference numeral 1 designates an electrodeless high-frequency discharge lamp excited by a high-frequency generator 2 via a microwave resonator 3. The lamp 1 is positioned in the gap, i.e., between the pole pieces, of an electromagnet 4. One of the pole pieces has a bore 5 therethrough, from which the light generated by the lamp 1 emerges, along a radiation axis denoted by a dot-dash line.

Light from the lamp 1 passes through the flame 6 of a burner 7 to which the substance under investigation is supplied from a vessel 8. Behind the flame 6 there is arranged a spectroscopic instrument 9, such as a monochromator or a filter, which only allows a narrow spectral band including the particular spectral line of interest to be transmitted; for example, the restricted pass band of instrument 9 may be selected to accommodate the full spread between and including lines 17 and 18 in FIG. 3, as will be understood. Reference number 10 designates a photoelectric detector, connected to an amplifier 11. This amplifier is, in turn, connected to an indicator instrument or other display means 12.

A pulse generator 14 of square-wave bursts of current excites the coils 13 of the electromagnet 4. The generator 14 and the amplifier 11 are synchronized with each other, as suggested by the connection 15.

Figure 2A:
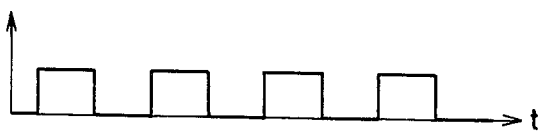
FIGS. 2a–2e are coordinate graphs depicting the waveforms of magnet-excitation current and of signal sequences provided by the detector of FIG. 1, all as functions of the same time scale.
Figure 3:
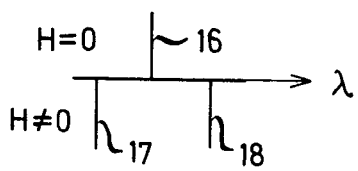
FIG. 3 is a simplified spectral display of the time-alternating spectral lines occurring in the device of FIG. 1.

In operating the device of FIG. 1, generator 14 supplies square-shaped current pulses, as illustrated in FIG. 2a, varying periodically in amplitude, between zero and a maximum value, thereby similarly changing the strength of the field generated across the gap of the electromagnet 4. As shown in FIG. 3, only the resonance line 16 of the discharge lamp 1 occurs, when the magnetic field H is of zero value. However, when the magnetic field has reached its maximum value, only the shifted lines 17 and 18 occur, being respectively shifted to both sides of the resonance line 16. Assuming the line 16 to be the cadmium line, i.e., at the wavelength $\lambda$ of 228.8 nm., then for a frequency shift of about 0.01 A. a magnetic field strength of approximately four to five thousand oersteds is required.

If the flame 6 burns "empty," i.e., does not contain any cadmium in the observed example, then the time-multiplexed signal components impinging upon the detector 10 will be of equal intensity. In that circumstance, the detector 10 produces a steady D-C voltage output, and the display means 12 indicates the value zero.

If, however, the flame 6 contains the desired element (in the observed example, cadmium), only the resonance line 16 will be absorbed by the same, and there will be no specific absorption by this element at the frequency-shifted lines 17–18. In this circumstance, the signal generated by the detector 10 (see FIG. 2b) is characterized by a signal component 16' which occurs at time intervals when the magnetic field strength is zero, and by a different signal component 17' which occurs at interlaced time intervals when the magnetic field is at its maximum value.

Figure 2B:
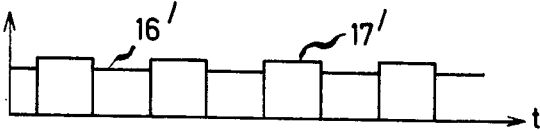
Figure 2C:
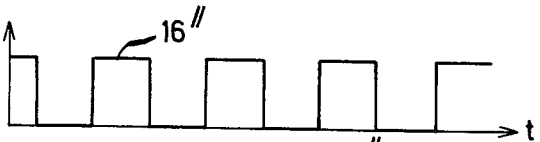
Figure 2D:
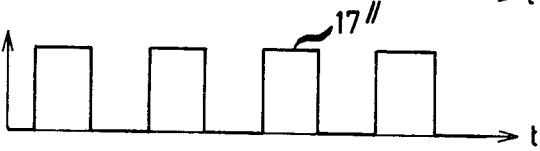
Figure 2E:
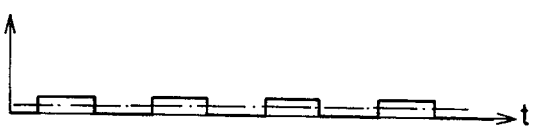

The amplifier 11 is synchronized with the generator 14 and can therefore synchronously commutate or separate (from each other) the two signal components illustrated in FIG. 2b, as illustrated in FIGS. 2c and 2d. The amplifier 11 is preferably designed as a logarithmic amplifier so that the signals which it generates are directly proportional to the extinction (atomic absorption). In the display means 12, the difference of the two amplified signal components 16″ and 17″ is presented, and FIG. 2e illustrates the waveform of this difference. The difference signal shown in FIG. 2e is directly proportional to the absorption and therewith to the concentration of the desired element in the sample. Unspecific absorptions, by the background and by the matter containing the element under investigation, are effectively eliminated and do not degrade the display indication; this is true whether the display uses a cathode-ray oscillograph with horizontal sweep keyed to the pulse cycle of generator 14, or whether the display uses a D'Arsonval meter wherein mechanical and electrical time constants assure a smoothed steady displayed level (e.g., the dot-dash line of FIG. 2e) above zero reference.

Figure 4:
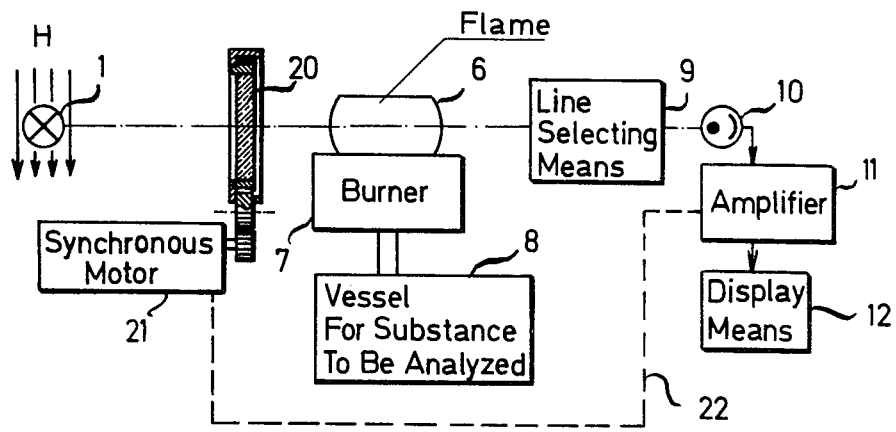
FIG. 4 is a diagram similar to FIG. 1 to illustrate another embodiment, which uses the linear Zeeman-effect in the transverse magnetic field.
Figure 5A:
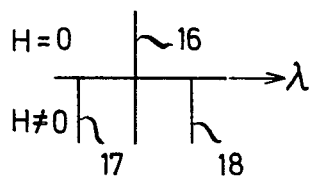
FIGS. 5a and 5b are spectral displays similar to that of FIG. 3 to illustrate the lines occurring for different modes of operation of the device of FIG. 4.

FIG. 4 illustrates an embodiment using the Zeeman-effect in the transverse magnetic field. Here, the electrodeless high-frequency discharge lamp 1 is arranged in a magnetic field H having flux lines oriented transverse to the direction of light emission, as suggested by the arrows at H. As shown by FIG. 5a, only the resonance line 16 occurs, when the magnetic field H is zero. If, however, the magnetic field H assumes a certain value different from zero, then in addition to the frequency-shifted lines 17 and 18, the resonance line 16 will also occur. The resonance line 16 is polarized parallel to the direction of the magnetic field, whereas the lines 17 and 18 are polarized normal to the direction of the magnetic field.

Figure 5B:
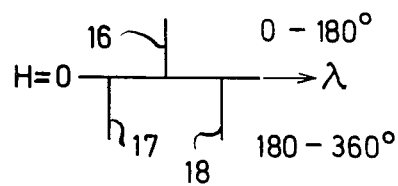

In the illustrated example, a D-C magnetic field H has been selected, and in the path of rays there is arranged a rotating disk 20 provided in successive sectors with polarizing filters having orthogonally oriented polarizing axes. Thus, as shown in FIG. 5b, upon rotation of the disk 20, the resonance line 16 alone and the two frequency-shifted lines 17–18 occur in alternation; for the first increment of rotation (e.g., 0° to 180°) only the resonance line 16 occurs, and for the succeeding (other) increment of rotation (e.g., 180° to 360°) only the shifted lines 17–18 occur. The disk 20 is driven by a synchronous motor 21 synchronizing the amplifier 11, as shown by the line 22.

Operation of the device illustrated in FIG. 4 corresponds to that of the embodiment shown in FIG. 1.

Figure 6:
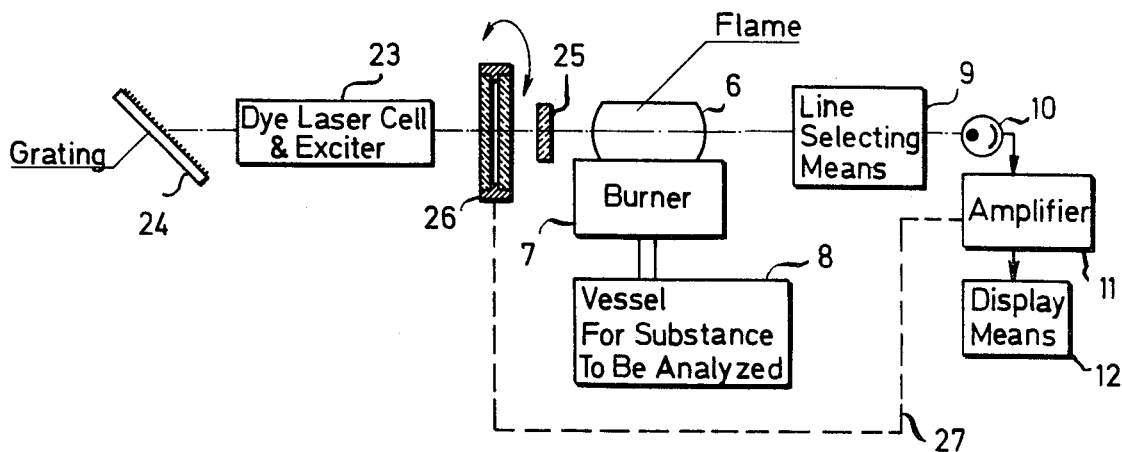
FIG. 6 is another diagram similar to FIG. 1 to illustrate a still further embodiment, which uses a frequency-modulated laser.

In the embodiment of FIG. 6, a dye laser is used as a spectroscopic radiation source. The cell and exciter unit of this laser is referenced 23. The optical resonator is provided by a grating 24 and a partially-reflecting mirror 25. The radiation produced by this laser covers a definite frequency range, extending a few angstrom units (A.). A Fabry-Perot filter 26 is placed across the axis of the optical resonator, and arched arrowheads will be understood to depict the periodic change in inclination of filter 26 with respect to the laser axis. By such displacement of the filter, two sharp lines are alternatingly separated from the laser radiation and alternatingly pass through the flame 6.

As indicated by the line 27, the inclination changes at filter 26 are synchronized with the amplifier, to enable differential evaluation of the separate signals, as previously described. Again, operation of the device of FIG. 6 corresponds to that given for the device of FIG. 1.

What is claimed is:

1. A device for the spectrochemical determination of the concentration of an element in a sample, said element having a characteristic spectral absorption line, said device comprising a radiation source producing radiation of a first discrete frequency, detector means electrically responsive to such radiation and aligned to receive the same, line-selecting means at said spectral absorption line and interposed between said source and said detector on said alignment, means for interposing the sample between said source and said line-selecting means and on said alignment, means operative to shift said radiation to a second discrete frequency slightly offset from said first frequency, one of said frequencies being selected to match said spectral absorption line and the other of said frequencies being removed from said line and within the response range of said line-selecting means, and means responsive to the output of said detector means for differentially evaluating detector response to transmission through the sample of radiation at one in relation to that at the other of said frequencies.

2. The device of claim 1, in which said frequency-shifting means is operative in a recurrent cycle of shifting between said frequencies.

3. The device of claim 2, in which said detector means includes an amplifier commutated synchronously with said shifting means.

4. The device of claim 2, in which said cycle comprises interlaced equal periods in which radiation on said alignment is at each of said frequencies.

5. The device of claim 2, in which said cycle comprises interlaced equal periods alternating between one devoted exclusively to radiation at the absorption-line frequency of the element and another which includes a frequency displaced from said absorption-line frequency.

6. The device of claim 1, in which the radiation source is a spectroscopic light source, and in which said frequency-shifting means comprises selectively operable means for establishing a magnetic field at the light source, said field being oriented with its flux lines extending substantially parallel to said alignment, whereby in the unoperated condition of said last-defined means said radiation is at one frequency and in the operated condition of said last-defined means said radiation is at a second frequency which is shifted from said one frequency.

7. The device of claim 1, in which the radiation source is a spectrographic light source, and in which said frequency-shifting means comprises means establishing a D-C magnetic field at said light souce, said field being oriented with its flux lines substantially normal to said alignment, polarizing filter means comprising separate elements with orthogonally related polarizations, and means for selectively shifting from one to the other the placement of said elements in said alignment.

8. The device of claim 1, in which the radiation source is a spectrographic light source, and in which said frequency-shifting means comprises selectively operable means for establishing a magnetic field at the light source, said field being oriented with its flux lines extending substantially normal to said alignment, said selectively operable means alternately establishing a first condition of zero magnetic field and a second condition of maximum magnetic field, and a filter with a fixedly oriented light-polarizing characteristic interposed between said light source and said detector and on said alignment.

9. The device of claim 1, in which said light source is an electrodeless high-frequency discharge device, and in which said frequency-shifting means includes means for establishing at said source a magnetic field with parallel lines of force traversing said source.

10. The device of claim 1, in whch said source comprises a quantum-electronic radiation source having a characteristic radiation frequency, and in which said frequency-shifting means comprises means for modulating said characteristic radiation frequency.

11. The device of claim 10, in which said modulating means comprises a Fabry-Perot filter and means for selectively shifting the inclination thereof on and with respect to the axis of said source.

12. The device of claim 2, in which said detector means includes a logarithmic amplifier synchronously commutated with operation of said shifting means, whereby the detector output is characterized by the quotient of transmissions detected at the respectively shifted frequencies.

13. The device of claim 1, and including, between said source and said detector, filter means characterized by a passband essentially restricted to include said first and second frequencies.

References Cited

UNITED STATES PATENTS

| | | | |
|---|---|---|---|
| 3,565,567 | 2/1971 | Rains | 356—87 |
| 3,413,482 | 11/1968 | Ling | 356—87 |
| 3,588,253 | 5/1971 | Wittmann | 356—93 |
| 3,546,622 | 12/1970 | Peterson et al. | 331—94.5 |
| 3,351,761 | 11/1967 | Hamby et al. | 331—94.5 |
| 3,358,243 | 12/1967 | Collins, Jr., et al. | 331—94.5 |

RONALD L. WIBERT, Primary Examiner

V. P. McGRAW, Assistant Examiner

U.S. Cl. X.R.

250—226; 356—97